Figure 1:
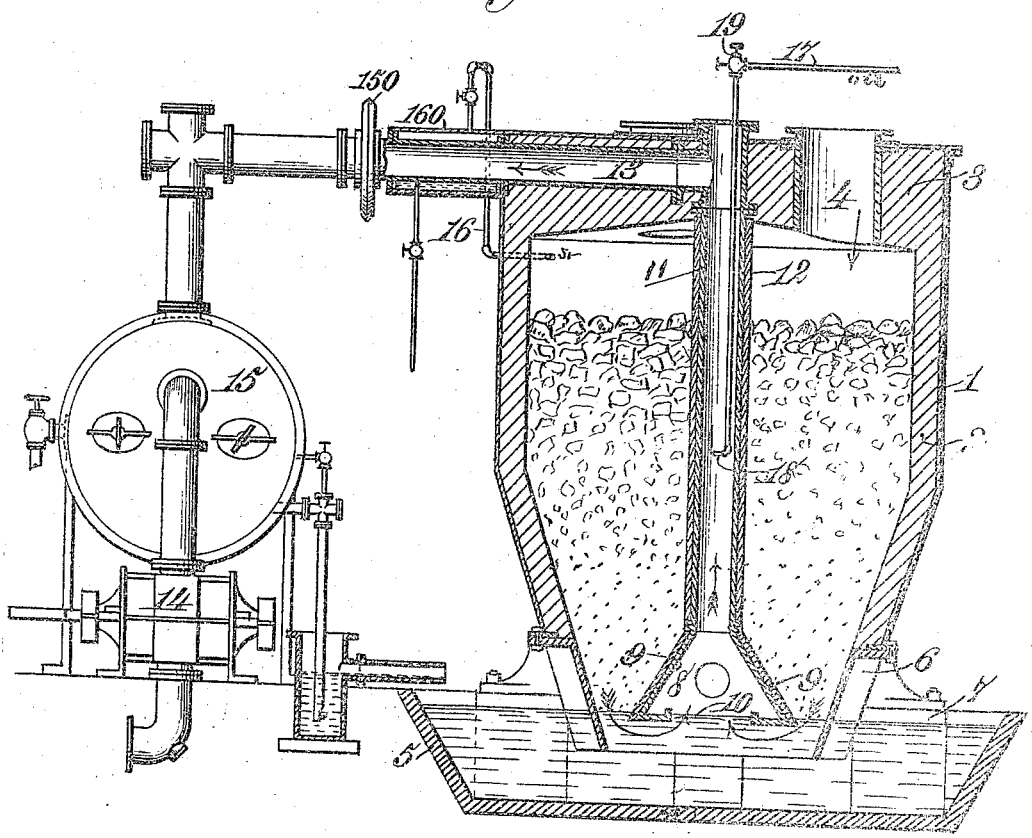

R. P. CONKLING.
GAS PRODUCER.
APPLICATION FILED OCT. 26, 1909.

965,086.

Patented July 19, 1910.
2 SHEETS—SHEET 1.

Witnesses:

Inventor:
Roscoe P. Conkling.
By James L. Norris
Atty.

R. P. CONKLING.
GAS PRODUCER.
APPLICATION FILED OCT. 26, 1909.
965,086.
Patented July 19, 1910.
2 SHEETS—SHEET 2.
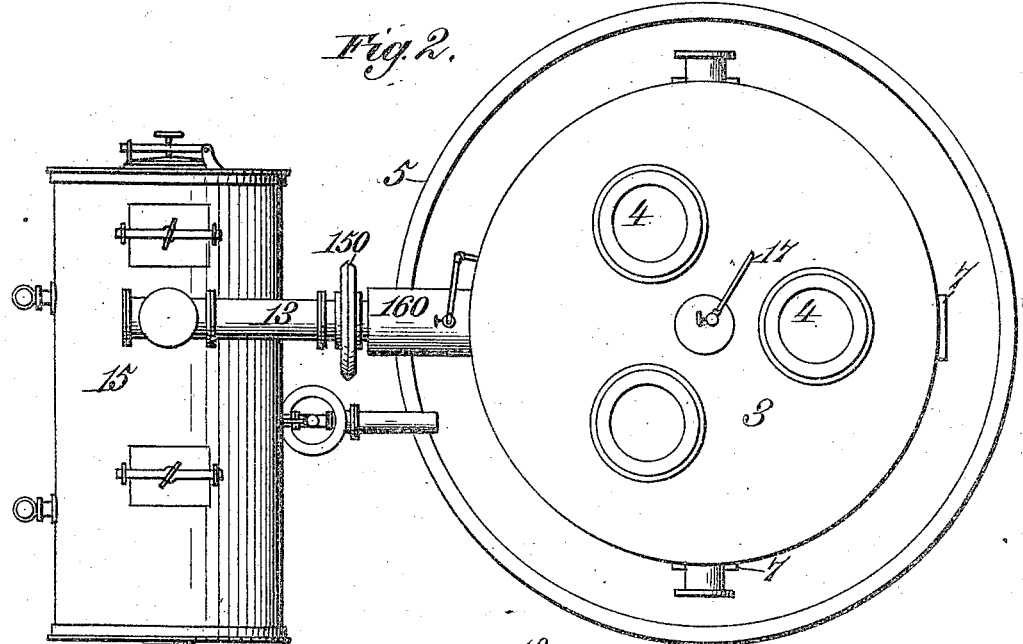
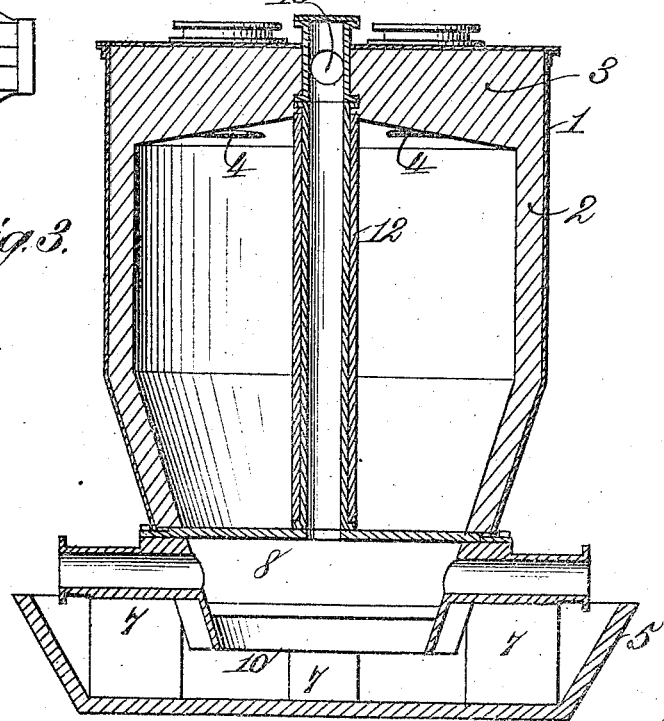
Witnesses.
Robert Couitt
Inventor,
Roscoe P. Conkling,
By James L. Norris
Atty.

UNITED STATES PATENT OFFICE.

ROSCOE P. CONKLING, OF SAN LUIS POTOSI, MEXICO.

GAS-PRODUCER.

965,086.  Specification of Letters Patent.  Patented July 19, 1910.

Application filed October 26, 1909. Serial No. 524,594.

*To all whom it may concern:*

Be it known that I, ROSCOE P. CONKLING, a citizen of the United States of America, residing at San Luis Potosi, Mexico, have invented certain new and useful Improvements in Gas-Producers, of which the following is a specification.

My present invention relates to improvements in gas producers, and it has for its object to provide a gas producer which is comparatively simple in its construction and which is capable of being operated continuously, it being so constructed that ash or refuse accumulations from the fuel may be quickly and easily removed and without disturbing the fire-bed or permitting the escape of any gas while the fuel may be added to the producer or generator with facility through doors or openings which may remain open to the atmosphere to admit air for the purpose of supporting combustion.

Another important object of the invention is to provide a gas producer with means for conducting the gas therefrom whereby any ash or impurities leaving the fire-bed shall be intercepted and collected by a water seal at the base of the producer, and the gas before leaving the producer is conducted through an offtake which is heated to such a degree of temperature under the influence of the fire-bed as will insure a conversion of any tarry matter contained in the gas into fixed gases, while any water vapor passing through the offtake with the gas will be broken down, the producer providing a relatively simple and inexpensive means for continuously generating a supply of gas which possesses a high degree of purity and is well adapted for heating purposes and as a motive fluid for the operation of gas engines.

To these and other ends, the invention consists in certain improvements, and combinations and arrangements of parts, all as will be hereinafter more fully described, the novel features being pointed out particularly in the claims at the end of the specification.

In the accompanying drawing: Figure 1 represents a central vertical section of a gas producer constructed in accordance with the present invention; Fig. 2 is a plan view of the producer as shown in Fig. 1; and Fig. 3 represents a sectional view of the producer or generator taken at right angles to the plane of the section represented by Fig. 1.

Similar parts are designated by the same reference characters in the several views.

In the accompanying drawing, I have shown one embodiment of a gas producer or generator constructed in accordance with the present invention. It will be understood, however, that the construction shown in the drawing is given essentially as an example of an apparatus embodying the invention and that the invention is not limited to the specific construction and arrangement shown, as certain conditions or requirements may render it necessary to modify or change the detail construction or the relative arrangement of the parts in order that the invention may be applied to the best advantage.

In the present instance, the producer or generator comprises a shell 1 which may be provided with a lining 2 of fire-brick or refractive material. This shell is adapted to receive and contain the fuel from which the gas is to be obtained and its upper end is substantially closed by a top 3, the top however being provided with a suitable number of fuel and air-feeding openings 4 which may remain open during the operation of the producer.

The shell of the generator is supported above a shallow well or basin 5 containing a body of water or other liquid, this water serving as a liquid seal to prevent the escape of gas to the atmosphere. Any suitable structure may be provided whereby the generator shell is supported in proper position with reference to the water containing well. In the present instance, the shell of the generator rests upon a base 6 which in turn is supported above the well 5 by appropriate standards 7. The sides of the base and the lower portion of the shell preferably slope inwardly and downwardly to form a relatively restricted bottom for the generator which will provide a sufficient support for the fuel but will permit the ash or other refuse from the fuel to fall into the well.

Between the inwardly sloping sides of the base is arranged a gas collecting chamber 8 which preferably extends transversely across the bottom of the generator shell, its opposite longitudinal sides 9 in the present instance sloping outwardly and downwardly in reverse relation while the bottom of this chamber is immersed to a slight extent in the water or liquid contained in the well, the sloping sides of the base 6 being immersed in the liquid in the well to a greater extent. The bottom of the gas chamber is provided with an opening 10 through which the gas from the fuel enters the said chamber.

In order to insure the conversion of any tarry matter into fixed gases before leaving the generator and also to break down any water vapors that may be carried along with the gas, I provide an offtake for the gas which is subject to the heat of the fire-bed whereby the gas upon encountering the highly heated walls of the offtake will effect a conversion of tarry matter into fixed gases and will cause any water vapors carried along with the gas to be broken down. In the present instance, I provide a stand pipe or uptake which extends upwardly from the gas chamber 8 through the fire-bed and fuel and laterally beneath the top of the generator shell, that shown consisting of a cast iron or other suitable pipe 11 which may be surrounded by a refractory covering 12 whereby the walls of the pipe may be heated to the proper degree but will be protected from overheating or burning. The lower end of the pipe may be conveniently secured to the top of the gas chamber while its upper end is connected below the top of the generator shell to an offtake pipe 13, the latter being connected with an exhauster 14 whereby the gas is drawn from the generator. It may be preferable to interpose a scrubber 15 between the exhauster and the generator whereby any impurities or other matter, such as ash, held in suspension in the gas, may be intercepted, an expansion joint 150 being connected in the offtake pipe between the scrubber and generator.

If so desired, a steam supply pipe 16 may be introduced into the generator at a point above the fuel bed for the purpose of admitting steam to increase the hydrogen constituent of the gas, a vaporizer 160 surrounding the offtake pipe and serving to supply steam to said pipe. The quality of the gas may also be made richer by introducing crude oil to the gas at the proper point. As an instance, I have shown a crude oil supply pipe 17 which passes downwardly into the uptake and has a nozzle or atomizing device 18 fitted to its lower end at a suitable distance above the gas chamber, this nozzle being arranged to project the crude oil in atomized form against the highly heated walls of the uptake pipe, the resulting gas mingling with the gas from the fuel passing through the uptake. A suitable valve 19 may be provided for this crude oil supply pipe at a suitably exposed location exteriorly of the generator.

In operating a gas producer constructed in accordance with the present invention, water is supplied to the well until its level slightly submerges the bottom of the gas chamber which is at the lower end of the stand pipe or uptake. Fuel of a suitable character is also introduced into the generator through the openings 4 at the top, and the fire is kindled upon the top of the fuel bed. The products of combustion from the fuel owing to the action of the exhauster are drawn down through the fuel by a downdraft and pass through the thin film of water and thence into the opening in the bottom of the gas chamber, such gases then passing upwardly through the stand pipe or uptake to the exhauster or to any of the usual or well known devices for scrubbing, purifying or otherwise treating the gas. The walls of the stand pipe or uptake being surrounded by the fuel, they will be heated to a relatively high degree of temperature, and the gas while passing through the stand pipe or uptake is heated to a degree sufficient to convert any tarry matter it may contain into fixed gases and such water vapor as may be carried along with the gas will be broken down or decomposed. The outwardly sloping divergently arranged walls of the gas chamber produce a relatively wide mouth for the lower end of the uptake, the surface presented to the water being relatively extensive although there is a shallow film of water which submerges the gas inlet. The gas from the fuel is therefore caused to enter the uptake in the form of a relatively extensive, but thin film, and this film of gas being exposed to the water will precipitate any ash from the fuel, the particles of ash being moistened by the water and thereby caused to settle into the well. The relatively large mouth or inlet for the uptake which is provided by this gas chamber effectually prevents clogging or choking with ash or other matter.

The sides of the base of the generator are submerged in the water a distance sufficient to prevent either the escape of gas to the atmosphere or the entrance of air from the atmosphere into the uptake. A space, however, is provided beneath the base of the generator for the collection of ash, and this ash may be removed from time to time as may be necessary from the exterior of the generator and without in any way interfering with the operation of the producer, so that the generator is capable of operating continuously.

I claim as my invention—

1. A gas producer comprising a shell to contain the fuel, an upright offtake mounted within the fuel zone of the generator and having a gas inlet located at a point below the fuel zone, and a liquid seal interposed between the gas inlet of the offtake and the fuel zone of the generator and through which the gas from the fuel is adapted to pass before entering the offtake.

2. A gas producer comprising a shell to contain the fuel, a gas offtake extending downwardly within the shell through the fuel zone and having at its lower end a gas inlet located below the fuel zone, the gas offtake being subject to heat of the fuel whereby the heated walls of the offtake will act to convert any tarry matter carried off with the gas into fixed gases.

3. A gas producer comprising a shell to contain the fuel and having a fuel and air opening in its upper portion, a water seal arranged at the bottom of the shell, and a gas offtake depending within the shell through the fuel zone and having a gas inlet at its lower end submerged in the liquid seal.

4. A gas producer comprising a shell to contain the fuel, a stand pipe depending within the shell through the fuel zone and having an enlarged or flared gas inlet at its lower end, and a water seal arranged below the fuel zone and having the enlarged or flared gas inlet of the uptake immersed therein.

5. A downdraft continuously operative gas producer comprising a generator shell having its upper end provided with a fuel and air opening, a well located beneath the generator shell, a base arranged at the bottom of the generator shell and having inwardly sloping sides which are submerged in the liquid containing well, and a gas uptake depending within the generator shell and through the fuel zone and having a gas chamber at its base the bottom of which chamber is immersed in the liquid of the well to form a gas seal.

6. A gas producer comprising a generator shell adapted to contain the fuel, a single gas uptake extending vertically within and surrounded by the fuel zone of the shell and having a gas inlet at its base which inlet is located below the fuel zone, and a crude oil supply pipe contained within the gas uptake and having means for projecting atomized oil against the heated wall of the uptake.

7. A gas producer comprising a generator shell adapted to contain the fuel, a gas offtake extending vertically and centrally through the fuel containing portion of the shell and having a gas inlet at its lower end which inlet is located below the fuel zone, a steam pipe leading into the generator, and a vaporizer subject to the heat of the gases passing through said offtake for generating and supplying steam to said pipe.

In testimony whereof I have hereunto set my hand in presence of two subscribing witnesses.

ROSCOE P. CONKLING.

Witnesses:
  GEO. A. WADDILL,
  ARCHIE ELLISON.